3,410,902
3-OXO OR OXY-1-PHENYL-1-
INDANETHYLAMINES
Marshall D. Draper, Woodland Hills, Calif., assignor to
Rexall Drug and Chemical Company, Los Angeles,
Calif., a corporation of Delaware
No Drawing. Continuation-in-part of application Ser. No.
432,393, Feb. 12, 1965. This application Aug. 12, 1965,
Ser. No. 479,273
9 Claims. (Cl. 260—570.8)

ABSTRACT OF THE DISCLOSURE 1-phenyl-1-indanethylamines having an oxo or hydroxyl radical at the 3-position and a lower alkyl, lower cycloalkyl or lower alkenyl radical substituted on the nitrogen atom and having pharmacological activity as central nervous system depressants, antipyretic agents and anticholinergic agents.

---

This application is a continuation-in-part of my application entitled, "Substituted 3-Oxoindans," Ser. No. 432,393, filed Feb. 12, 1965.

This invention relates to compositions of matter classified in the art of chemistry as substituted 3-oxoindans and to intermediates obtained in the synthesis thereof.

The invention sought to be patented, in its final product composition aspect, is described as residing in the concept of a chemical compound having a molecular structure in which the 1-phenyl-1-indanethylamine nucleus bears at the 3-position an oxo or hydroxyl radical and at the nitrogen atom, a lower alkyl, lower cycloalkyl or lower alkenyl radical, and the hereinafter described equivalents thereof.

The invention sought to be patented, in its intermediate product composition aspect, is described as residing in the concept of a chemical compound having a molecular structure in which the 1-phenyl-1-indanacetamide nucleus bears at the 3-position an oxo radical and at the nitrogen atom, a lower alkyl, lower cycloalkyl or lower alkenyl radical, and the hereinafter described equivalents thereof.

As used throughout the specification and/or in the claims, the term "lower alkyl" embraces straight and branched chain alkyl radicals containing 1 to 6 carbon atoms, for example methyl, ethyl, isopropyl, sec-butyl, tert-butyl, n-amyl, n-hexyl, 2-ethylbutyl and the like; the term "lower cycloalkyl" embraces cycloalkyl radicals containing from 3 to 9 carbon atoms, for example cyclopropyl, cyclobutyl, cyclopentyl, cyclohexyl, cycloheptyl, cyclooctyl, and cyclononyl, and lower alkyl substituted cycloalkyl radicals having a total of 3 to 9 carbon atoms, for example, methylcyclopentyl, ethylcyclohexyl and the like; the term "lower alkenyl" embraces straight or branched chain monovalent radicals of the empirical formula $C_nH_{2n-1}$ wherein $n$ is an integer of 2 to 6, for example vinyl, allyl, n-butenyl, n-hexenyl, 2-ethylbutenyl and the like; the term "lower alkoxy" embraces straight and branched chain alkoxy radicals containing 1 to 6 carbon atoms, for example methoxy, ethoxy, isopropoxy, tert-butoxy, n-hexyloxy, 2-ethylbutoxy and the like; and the term "halo" embraces fluoro, chloro, bromo and iodo.

The tangible embodiments of this invention, in both its final product and intermediate composition aspects, possess the inherent general physical characteristics of being, in the form of their acid-addition salts, solid crystalline materials. Infrared spectral data and elemental analysis, taken together with the nature of the starting material and mode of synthesis, positively confirm the structure of the compounds sought to be patented.

The tangible embodiment of this invention, in its final product composition aspect, possess the inherent applied use characteristics of having pharmacological activity without adverse toxicity as central nervous system depressant, antipyretic and anticholinergic agents as determined by recognized and accepted pharmacological test procedures, as well as being useful as chemical intermediates in the synthesis of other chemical compositions that possess pharmacological activity. For example, treatment of the tangible embodiments of this invention, in its final product composition aspect, which bear a lower alkyl radical at the nitrogen atom of the nucleus with an aluminum alkoxide and a cyclic ketone yields compounds which are described and claimed in my application entitled "Substituted Spiranes," Ser. No. 432,375, filed Feb. 12, 1965 and now U.S. Patent No. 3,282,948. In addition, treatment of the tangible embodiments of this invention, in its final product composition aspect, which bear an oxo radical at the 3-position and a lower alkyl or lower cycloalkyl radical at the nitrogen atom of the nucleus with an aldehyde and an acid catalyst yields compounds which are described and claimed in my application entitled "Substituted Indenopyridines and Processes of Making and Using the Same," filed concurrently herewith.

The tangible embodiments of this invention, in its intermediate composition aspect, possess the inherent applied use characteristics of being valuable as chemical intermediates in the preparation of the tangible embodiments of this invention, in its final product composition aspect, by the reaction sequence to be described hereinafter.

The manner and process of making and using the invention will now be generally described so as to enable one skilled in the art of chemistry to make and use the same as follows:

The starting materials for the preparation of the tangible embodiments of this invention are 3-oxo-1-phenyl-1-indanacetic acids, which are known compounds that may be conveniently prepared as described by C. F. Koelsch, J. Org. Chem. 25: 2088–91 (1960).

The conversion of the starting materials to the tangible embodiments of this invention is carried out as described in the following reaction sequence:

REACTION SEQUENCE

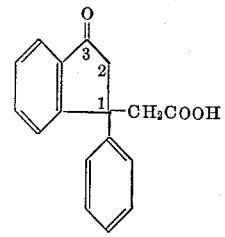

STARTING MATERIAL

1. SOCl₂
2. RNH₂

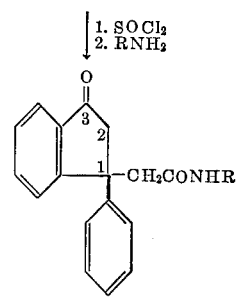

INTERMEDIATE

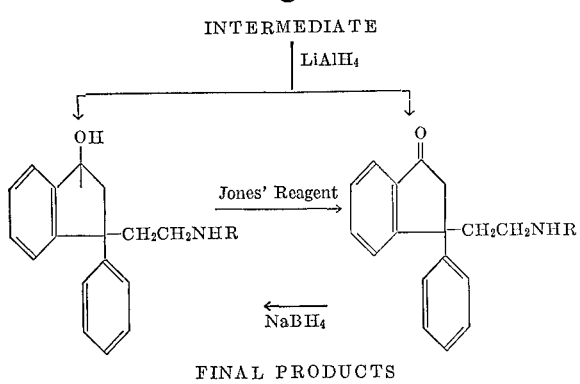

FINAL PRODUCTS where R is lower alkyl, lower cycloalkyl or lower alkenyl.

The first step in the reaction sequence depicted hereinabove is the conversion of the 3-oxo-1-phenyl-1-indanacetic acid starting material into its corresponding N-lower alkyl, N-lower cycloalkyl or N-lower alkenyl amide. The conversion is carried out by first forming the acid halide of the acid starting material which is then treated with an appropriate alkylamine. The acid halide is preferably prepared by refluxing the starting material with a thionyl halide, for example thionyl chloride, in the presence of an inert organic solvent such as benzene. The acid halide thus formed is then treated at room temperature in the presence of a low boiling organic solvent such as acetone with a lower alkyl or lower alkenyl amine. For example, where R is methyl, methylamine is employed. The so-formed intermediate product is recovered by conventional techniques of crystallization.

The second step in the reaction sequence comprises the reduction of the N-lower alkyl, N-lower cycloalkyl or N-lower alkenyl-3-oxo-1-phenyl-1-indanacetamide to form the tangible embodiments of this invention in its final product composition aspect. The reduction is carried out at reflux temperature in the presence of an inert organic solvent such as, for example, tetrahydrofuran, employing as the reducing agent an alkali metal aluminohydride such as lithium aluminum hydride. The reaction product consists of a mixture of the 3-oxo and 3-hydroxy substituted N-R-1-phenyl-1-indanethylamine. Further treatment of the mixture with an alkali metal borohydride, for example sodium borohydride, results in conversion of the 3-oxo compound to the 3-hydroxy compound, while treatment of the product mixture with Jones' reagent (chromium-trioxide in sulfuric acid) results in conversion of the 3-hydroxy compound to the 3-oxo compound.

The product mixture may be employed without further treatment where the product is intended to be used as an intermediate in the preparation of substituted spiranes such as are disclosed and claimed in my application entitled "Substituted Spiranes," Ser. No. 432,375, filed Feb. 12, 1965, and now U.S. Patent No. 3,282,948. The tangible embodiments of this invention in its final product composition aspect are recovered by conventional isolation techniques and are conveniently characterized and identified in the form of their acid-addition salts.

Starting materials wherein either or both benzene rings bear one or more lower alkyl, hydroxy, lower alkoxy, trifluoromethyl or halo substituents are prepared by the same techniques set forth in the Koelsch paper referred to hereinabove and are the full equivalents to the specific starting materials depicted hereinabove. Their use in the above described reaction sequence results in the preparation of intermediates and final products having lower alkyl, hydroxy, lower alkoxy, trifluoromethyl or halo substitution on the benzene rings at the same place as in the starting materials, such intermediates and products having the same utility as the specific intermediates and products depicted in the above reaction sequence.

The tangible embodiments of this invention, in its final product composition aspect can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and polybasic acids, such as citrate, tartrate, maleate and malate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the free bases from which they are derived and are included within the scope of this invention.

The tangible embodiments of this invention in its final product composition aspect, either as free bases or in the form of a non-toxic pharmaceutically acceptable acid-addition or quarternary ammonium salt, can be combined with conventional pharmaceutical diluents and carriers to form such dosage forms as tablets, capsules, suspensions, solutions, suppositories and the like.

The best mode contemplated by the inventor for carrying out his invention will now be set forth as follows:

EXAMPLE 1

(a) N-methyl-3-oxo-1-phenyl-1-indanacetamide 3-oxo-1-phenyl-1-indanacetic acid (52.0 g., 0.195 mole) dissolved in benzene (250 ml.) is refluxed briefly to remove traces of moisture. Thionyl chloride (100 ml.) is added and the mixture refluxed until gas evolution becomes slow. The solvents and excess thionyl chloride are removed under reduced pressure and the residue dissolved in acetone (200 ml.) and added slowly with stirring and ice-cooling to a mixture of 40% methylamine (500 ml.) and acetone (500 ml.). After addition the mixture is stirred for 30 minutes and the acetone then removed under reduced pressure. The aqueous solution remaining contains a precipitate of heavy oil and is extracted with three portions (250 ml. each) of chloroform. The chloroform extracts are combined, washed successively with four portions (100 ml. each) of water, 2 N hydrochloric acid (200 ml.) and three portions (200 ml. each) of water. The chloroform is removed in vacuo to yield 22.2 g. of product. The washes are combined and heated at 85° C. for 4 hours with 1 N hydrochloric acid (200 ml.). Extraction with chloroform yields an additional 19.1 g. of product. Total yield is 41.3 g. (75.8%).

For elemental analysis, the product is converted into its ethyl ketal by treatment, at elevated temperature for 48 hours, with ethylene glycol (100 ml.) in toluene (40 ml.) and in the presence of p-toluene sulfonic acid (50 mgm.). The ketal is recovered by addition of one volume of ether, washing with water, filtration through charcoal and evaporation of the ether. Recrystallization is from chloroform-ether.

Analysis.—Calculated for $C_{20}H_{21}NO_3$: C, 74.28%; H, 6.55%; N, 4.33%. Found: C, 73.98%; H, 6.52%; N, 4.36%.

(b) Mixture of 3-oxo- and 3-hydroxy-N-methyl-1-phenyl-1-indanethylamines

To a suspension of lithium aluminum hydride (15.5 g., 0.4 mole) in tetrahydrofuran (150 ml.) is added, slowly with stirring and cooling, a solution of N-methyl-3-oxo-1-phenyl-1-indanacetamide (38.0 g., 0.136 mole), prepared as described in step (a), in tetrahydrofuran (160 ml.). The reaction mixture is refluxed for 18 hours, then cooled and added to 550 g. ice containing 160 ml. concentrated hydrochloric acid. The solution is filtered, extracted three times with 100 ml. portions of ether and then made basic (pH 10.0) with 12 N sodium hydroxide. The mixture is filtered through diatomaceous earth, the filter cake being carefully washed with tetrahydrofuran. The filtrate is extracted three times with 300 ml. portions of ether. The ether extracts are dried over anhydrous magnesium sulfate and the ether removed in vacuo. The product, 31.2 g. of a heavy oil constitutes a mixture of the 3-oxo- and 3-hydroxy derivatives.

(c) N-methyl-3-oxo-1-phenyl-1-indanethylamine

A quantity of 13.5 g. of the mixture prepared as described in Example 1(b) is dissolved in glacial acetic acid (338 ml.) and 18 ml. of Jones' reagent (5.3 g. chromium trioxide dissolved in 4.6 ml. concentrated sulfuric acid with 20 ml. water added) is added dropwise with cooling in an ice bath. After the addition, the ice bath is removed and the mixture stirred at room temperature for 15 minutes and poured over 600 g. of ice. The mixture is neutralized with concentrated ammonium hydroxide to pH 8.5 and extracted with three 150 ml. portions of ether. The ether extract is washed with water, dried over anhydrous magnesium sulfate and evaporated to dryness to yield 12.5 g. (93%) of product is purified by conversion to its oxalate salt in ether and crystallized from methanolethyl acetate. Yield 13.7 g. of oxalate salt, M.P. 206–208°, which when recrystallized yields 5.0 g., M.P. 207–208.5° C.

Analysis.—Calculated for $C_{20}H_{21}NO_5$: C, 67.59%; H, 5.96%; N, 3.95%; O, 22.51%. Found: C, 67.73%; H, 5.88%; N, 4.12%; O, 22.29%.

(d) N-methyl-3-hydroxy-1-phenyl-1-indanethylamine

A quantity of 10 g. of the product mixture, obtained as described in Example 1(b), is dissolved in 95% ethanol (150 ml.) and then to the solution is added sodium borohydride (1.5 g.). The mixture is stirred overnight at room temperature. Water (100 ml.) is added and the solution is heated to boiling for 20 minutes, then cooled and the ethanol removed in vacuo. The aqueous mixture remaining is extracted with ether (two 150 ml. portions). The ether extracts are combined, washed with water, dried over anhydrous sodium sulfate and the ether removed in vacuo to yield 10 g. of a nearly colorless, heavy oil. The oil is dissolved in ether (150 ml.) and a saturated solution of oxalic acid is added with stirring until the solution is strongly acid. The precipitate which forms is recovered by filtration to yield 11.7 g. of the oxalate salt, M.P. 171–172.5° C.

Analysis.—Calculated for $C_{20}H_{23}NO_5$: C, 67.20%; H, 6.49%; N, 3.92%. Found: C, 67.10%; H, 6.49%; N, 3.90%.

The following example is illustrative of the preparation of other tangible embodiments of this invention in its intermediate and final product composition aspects.

EXAMPLE 2

(a) N-allyl-3-oxo-1-phenyl-1-indanacetamide

Anhydrous 3-oxo-1-phenyl-1-indanacetic acid (136 g., 0.512 mole) is refluxed for 6 hours in benzene (300 ml.) with thionyl chloride (250 ml., 4.1 moles). The solvent and excess thionyl chloride are removed under reduced pressure and the crude acid chloride is dissolved in dry benzene (300 ml.) and then slowly added, with cooling and stirring, to a solution of allyl amine (192 ml., 2.56 mole) in benzene (300 ml.). The mixture is allowed to stand for 18 hours at room temperature after which the solvent is removed under reduced pressure. The residue is dissolved in a mixture of ether and water, the water and ether layers separated and the water layer extracted several times with ether. The ether layer and combined ether extracts are washed with dilute base and acid, and finally with water, then dried over anhydrous magnesium sulfate and the solvent reduced under pressure to yield a heavy oil (84.5%, 131.5 g.).

For elemental analysis the product is converted to its semicarbazone by treatment with semicarbazide hydrochloride in the presence of sodium acetate and ethanol. Recrystallization from ethanol gives an almost colorless product, M.P. 123–125° C.

Analysis.—Calculated for $C_{20}H_{14}NO_2$: C, 68.30%; H, 6.16%; N, 15.35%; O, 9.34%. Found: C, 68.34%; H, 6.14%; N, 15.0%; O, 9.38%.

(b) Mixture of 3-oxo- and 3-hydroxy-N-allyl-1-phenyl-1-indanethylamines

N-allyl-3-oxo-1-phenyl-1-indanacetamide (118 g., 0.388 mole), prepared as described in Example 2(a), is dissolved in tetrahydrofuran (500 ml.) and the solution is slowly added with stirring to a suspension of lithium aluminum hydride (44 g., 1.06 mole) in tetrahydrofuran (100 ml.). The mixture is stirred slowly for several hours and then refluxed until gas evolution ceases (about 3 hours). The mixture is then cooled by an ice bath and, with stirring, decomposed by the successive addition of water (44 ml.), 15% sodium hydroxide (44 ml.) and again water (132 ml.). The decomposed reaction mixture is filtered, concentrated under reduced pressure and acidified with 10% hydrochloric acid followed by extraction with ether. The aqueous phase is basified by the slow addition of 6 N sodium hydroxide and again extracted with ether. The ether extracts are mixed, dried over anhydrous magnesium sulfate and the ether removed in vacuo. The product, 88 g. (78%) of a brown syrup, is a mixture of the 3-oxo and 3-hydroxy derivatives.

(c) N-allyl-3-oxo-1-phenyl-1-indanethylamine

A quantity of 5.5 g. of the mixture prepared as described in Example 2(b) is dissolved in glacial acetic acid (50 ml.) and 7 ml. of Jones' reagent (5.3 g. chromium trioxide dissolved in 4.6 ml. concentrated sulfuric acid with 20 ml. water added) is slowly added with stirring and cooling with an ice bath. After the addition, the ice bath is removed and the mixture stirred at room temperature for 20 minutes. Ice (150 g.) is added and the mixture stirred for 10 minutes, then basified by the addition of concentrated ammonium hydroxide. The product is extracted with ether and obtained in the form of its oxalate salt, M.P. 205–207° C.

Treatment of the mixture prepared as described in Example 2(b) with sodium borohydride in accordance with the procedure of Example 1(d) yields N-allyl-3-hydroxy-1-phenyl-1-indanethylamine.

EXAMPLE 3

(a) N-propyl-3-oxo-1-phenyl-1-indanacetamide 3-oxo-1-phenyl-1-indanacetic acid (36.0 g., 0.135 mole) is refluxed for 18 hours with thionyl chloride (72 ml.) and benzene (100 ml.). Excess thionyl chloride and the benzene are then removed under reduced pressure and the residue dissolved in benzene (180 ml.). This solution is added slowly with stirring to a solution of n-propylamine (21 g., 0.36 mole) in benzene (200 ml.). The excess n-propylamine is removed under reduced pressure and the residue treated with refluxing methanol (400 ml.) and 4 N hydrochloric acid (100 ml.) for 3 hours to remove imine contaminant. The solvent is removed and the product extracted with ether to yield 35 g. (85%) of the product as a heavy oil.

(b) N-propyl-3-hydroxy-1-phenyl-1-indanethylamine

The amide (35 g., 0.114 mole), obtained as described in Example 3(a), is dissolved in tetrahydrofuran (150 ml.) and added over a period of one hour to a stirred suspension of lithium aluminum hydride (13 g., 0.347 mole) in tetrahydrofuran (115 ml.), the temperature of the mixture being maintained at 25° C. The mixture is then refluxed for 9 hours, cooled and worked up as described in Example 1(c) to yield 23.5 g. (85%) of product that is characterized in the form of its hydrochloride salt, M.P. 95° C. (dec.).

Analysis.—Calculated for $C_{20}H_{26}NOCl$: C, 72.38%; H, 7.89%; N, 4.22%; Cl, 10.68%. Found: C, 71.81%; H, 8.03%; N, 4.26%; Cl, 10.68%.

(c) N-propyl-3-oxo-1-phenyl-1-indanethylamine

The product of step (b) above (6.85 g., 0.023 mole) is dissolved in glacial acetic acid (80 ml.) and a 2.14 molar chromium trioxide solution (10.4 ml.) is added over a 10 minute period. The temperature during the addition is maintained at 12–17° C. After addition, the mixture is stirred for 20 minutes at room temperature and then is poured over 180 g. of ice. The solution is washed with ether, basified and the amine extracted with methylene chloride. The extracts are washed with water, decolorized with charcoal and dried. The solvent is removed under reduced pressure to yield 4.5 g. (67%) of an oil that is converted to the oxalate salt for analysis, M.P. 220° C. (dec.).

Analysis.—Calculated for $C_{22}H_{24}NO_5$: C, 68.90%; H, 6.57%; N, 3.66%; O, 20.86%. Found: C, 68.73%; H, 6.74%; N, 3.69%; O, 20.96%.

EXAMPLE 4

(a) 6-methoxy-N-methyl-3-oxo-1-phenyl-1-indanacetamide 6-methoxy-3-oxo-1-phenyl-1-indanacetic acid (11.8 g., 0.04 mole) is refluxed for 18 hours with benzene (50 ml.) and thionyl chloride (20 ml.). The benzene and excess thionyl chloride are removed and the residue is dissolved in tetrahydrofuran (50 ml.). This solution is then slowly added to a cooled solution of 40% methylamine (80 ml.) in tetrahydrofuran 50 ml.). After the addition, the mixture is stirred for one hour at 25° C. and then the tetrahydrofuran is removed under reduced pressure. The precipitated product is extracted with chloroform and the extracts washed with water and dilute hydrochloric acid. Removal of the chloroform yields 11.9 g. of a gummy residue that is crystallized from methanol/ether in a yield of 7.75 (63%), M.P. 146–147° C.

Analysis.—Calculated for $C_{19}H_{19}NO_3$: C, 73.76%; H, 6.19%; N, 4.52%; O, 15.52%. Found: C, 74.15%; H, 6.08%; N, 4.54%; O, 15.54%.

(b) Mixture of 3-oxo- and 3-hydroxy-6-methoxy-N-methyl-1-phenyl-1-indanethylamines Lithium aluminum hydride (2.50 g., 0.065 mole) is suspended in tetrahydrofuran (25 ml.) and a solution of the acetamide (6.75 g., 0.022 mole), formed in step (a), in tetrahydrofuran (25 ml.) is added slowly with stirring. The mixture is refluxed for 18 hours, cooled and water (2.5 ml.) is slowly added, followed by 15% sodium hydroxide (2.5 ml.) and again water (7.5 ml.). The precipitated salts are removed by filtration, washed with tetrohydrofuran and the combined washes and filtrate evaporated to dryness under reduced pressure. The residue is dissolved in ether, washed with with water, extracted with 1 N hydrochloric acid, and the acid extracts basified and re-extracted with ether. The ether extract is evaporated to dryness. The product, 6.0 g. of an oil, constitutes a mixture of the 3-oxo- and 3-hydroxy derivatives.

(c) 6-methoxy-N-methyl-3-oxo-1-phenyl-1-indanethylamine

The mixed amines (6.0 g.), prepared as described in Example 4(b), are dissolved in glacial acetic acid (35 ml.) and the solution is cooled to 15° C. Jones' reagent (7.2 ml. of a mixture of 2.1 g. chromium trioxide, 1.8 ml. concentrated sulfuric acid and 8 ml. water) is added dropwise with cooling. Following the addition, the mixture is stirred at 25° C. for 20 minutes and then about ⅔ of the acetic acid is removed under reduced pressure without heating. Ice is added to the residue and the resulting solution is neutralized with concentrated ammonium hydroxide and extracted with chloroform. The chloroform extracts are washed with water, dried and the chloroform removed under reduced pressure to yield 5.5 g. (92%) of an oil that is analyzed in the form of its oxalate salt, M.P. 207–209° C.

Analysis.—Calculated for $C_{21}H_{23}NO_6$: C, 65.44%; H, 6.02%; N, 3.63%; O, 24.91%. Found: C, 65.74%; H, 5.81%; N, 3.76%; O, 24.81%.

EXAMPLE 5

(a) N-cyclopropyl-3-oxo-1-phenyl-1-indanacetamide

To a solution of 3-oxo-1-phenyl-1-indanacetic acid chloride (54.0 g., 0.19 mole) is added dropwise, with stirring and cooling, a solution of cyclopropylamine (124 g., 0.42 mole) in benzene (50 ml.). The mixture is stirred for 2 hours and then concentrated under reduced pressure. The oily residue is dissolved in methanol and treated with 4 N hydrochloric acid (50 ml.) for 4 hours to hydrolyze any imine that has formed. The methanol is removed and the mixture extracted with methylene chloride. The extract is washed with 2 N sodium hydroxide solution and water, dried and the solvent removed to yield 14.0 g. (24%) of a syrup.

(b) Mixture of 3-hydroxy- and 3-oxo-N-cyclopropyl-1-phenyl-1-indanethylamine

The amide formed in Example 5(a) (14.0 g., 0.046 mole) is dissolved in tetrahydrofuran (50 ml.) and the solution is added dropwise to a suspension of lithium aluminum hydride (5.3 g., 0.14 mole) in tetrahydrofuran (50 ml.). After the addition, the mixture is refluxed for 18 hours, cooled, decomposed by the successive addition of water (5.3 ml.), 6 N sodium hydroxide (5.3 ml.) and again water (16 ml.), and then filtered to remove aluminum salts. The filtrate is concentrated under reduced pressure, taken up in 4 N hydrochloric acid (50 ml.), extracted with ether, basified and again extracted with ether. Work-up yields 9.1 g. of a mixture of the 3-oxo- and 3-hydroxy derivatives.

(c) N-cyclopropyl-3-oxo-1-phenyl-1-indanethylamine

The mixture (5.4 g., 0.0185 mole), formed in Example 5(b), is dissolved in glacial acetic acid (40 ml.) and the solution cooled to 10–15° C. Jones' reagent (5.2 ml. of a mixture composed of 16 g. chromium trioxide, 14 ml. concentrated sulfuric acid and 60 ml. water) is added dropwise over a period of 10 minutes, with stirring. The mixture resulting is stirred for an additional 15 minutes at room temperature and then poured over ice. The acetic acid is removed by ether extraction, the solution made basic with concentrated ammonium hydroxide and the product extracted with ether. Washing, drying and concentration of the ether extract yields 5.5 g. of an oil that is converted to the oxalate salt, M.P. 209° C. (dec.), for analysis.

Analysis.—Calculated for $C_{22}H_{23}NO_5$: C, 69.28%; H, 6.08%; N, 3.68%. Found: C, 69.62%; H, 5.81%; N, 4.07%.

The foregoing description has related to the preparation of tangible embodiments of this invention from 3-oxo-1-phenyl-1-indanacetic acid and its hereinabove described equivalents. It will be readily apparent to one skilled in the art of chemistry that other lower aliphatic acids containing 3 to 6 carbon atoms bearing a 3-oxo-1-phenyl-1-indano radical can undergo the aforementioned reaction sequence to form amide intermediates and amine final products which have the same utility as the compounds described hereinabove. Examplary of such substituted lower aliphatic acid starting materials are 3-oxo-1-phenyl-1-indanopropionic acid, 3-oxo-1-phenyl-1-indanobutyric acid, 3-oxo-1-phenyl-1-indanovaleric acid, 3-oxo-1-phenyl-1-indano-(1-ethylacetic acid) and the like.

The subject matter which the applicant regards as his invention is particularly pointed out and distinctly claimed as follows:

I claim:
1. A compound of the formula

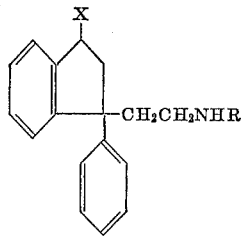

wherein R is a member of the group consisting of lower alkyl, cyclo-lower alkyl and lower alkenyl and X is selected from the group consisting of oxo and hydroxy.

2. N-methyl-3-oxo-1-phenyl-1-indanethylamine.
3. N-(n-propyl)-3-oxo-1-phenyl-1-indanethylamine.
4. N-allyl-3-oxo-1-phenyl-1-indanethylamine.
5. N-cyclopropyl-3-oxo-1-phenyl-1-indanethylamine.
6. N-methyl-3-hydroxy-1-phenyl-1-indanaethylamine.
7. N-(n-propyl)-3-hydroxy-1-phenyl-indanethylamine.
8. N-allyl-3-hydroxy-1-phenyl-1-indanethylamine.
9. N-cyclopropyl-3-hydroxy-1-phenyl-1-indanethylamine.

References Cited
UNITED STATES PATENTS 3,301,866   1/1967   Draper _____ 206—294.7

CHARLES B. PARKER, *Primary Examiner.*
ROBERT V. HINES, *Assistant Examiner.*